US012220802B1

(12) United States Patent
Lombard

(10) Patent No.: US 12,220,802 B1
(45) Date of Patent: Feb. 11, 2025

(54) MULTI-PURPOSE PAINT CAN TOOL

(71) Applicant: Craig Lombard, North Andover, MA (US)

(72) Inventor: Craig Lombard, North Andover, MA (US)

( * ) Notice: Subject to any disclaimer, the term of this patent is extended or adjusted under 35 U.S.C. 154(b) by 0 days.

(21) Appl. No.: 18/887,736

(22) Filed: Sep. 17, 2024

Related U.S. Application Data

(60) Provisional application No. 63/592,221, filed on Oct. 23, 2023.

(51) Int. Cl.
*B25F 1/00* (2006.01)
*B67B 7/00* (2006.01)
*B67B 7/12* (2006.01)
*B67B 7/44* (2006.01)

(52) U.S. Cl.
CPC .................. *B25F 1/00* (2013.01); *B67B 7/12* (2013.01); *B67B 7/24* (2013.01); *B67B 7/44* (2013.01)

(58) Field of Classification Search
CPC .... B67B 7/12; B67B 7/44; B67B 7/24; B67B 7/16
USPC ........... 7/151–156; 81/3.47, 3.48, 3.08, 3.09, 81/3.27, 3.36, 3.49
See application file for complete search history.

(56) References Cited

U.S. PATENT DOCUMENTS 945,643 A * 1/1910 Van Sant .................. B67B 7/24 30/411
952,170 A * 3/1910 Zeese ........................ B67B 7/24 7/152
1,230,344 A * 6/1917 Tweeddale ................ B67B 7/24 220/278
1,396,629 A * 11/1921 Hand ........................ B67B 7/44 30/446
1,466,108 A * 8/1923 Anderson ................. B67B 7/24 220/278
1,618,304 A * 2/1927 Nachtigal ................. B67B 7/44 7/152
1,923,779 A * 3/1933 Dye .......................... B67B 7/24 222/85
2,055,989 A * 9/1936 Starr .................... B65D 17/521 220/278
2,286,124 A * 4/1942 Storck ....................... B67B 7/24 220/278
4,580,302 A * 4/1986 Barth ........................ B67B 7/24 7/152
4,747,173 A * 5/1988 Marceau ................... B67B 7/14 81/3.55
6,237,227 B1 * 5/2001 Pojunas, Sr. .............. B26F 1/32 30/445

FOREIGN PATENT DOCUMENTS

GB 203072 * 9/1923

* cited by examiner

*Primary Examiner* — Bryan R Muller

(57) ABSTRACT

A device for opening and closing a paint can without damage to the paint can lid or paint can. The device can also perforate the paint can with holes around the perimeter of the paint can rim so that paint in the rim can return to the paint can. The device includes a T-shaped base with a can opener at the lower end of the T, two perforating spikes on the bottom, four bumpers for closing the paint can, and a magnet for holding the device to a paint can.

19 Claims, 4 Drawing Sheets

MULTI-PURPOSE PAINT CAN TOOL

CROSS-REFERENCE TO RELATED APPLICATIONS

This application claims priority to U.S. Provisional Patent Application 63/592,221, "Hammerhead", filed on Oct. 23, 2023, by Craig Lombard, said provisional patent application incorporated herein by reference in its entirety.

BACKGROUND

A typical paint can opener serves a single purpose to open a paint can. A hammer or rubber mallet will also close the lid of a paint can but will often warp the lid without the exact alignment of the lid and the can opening. The present inventions provide an improved tool to assist in the opening and closing of a paint can.

BRIEF SUMMARY

The present invention is a device for opening and closing a paint can without damage to the paint can lid or paint can. The device can also perforate the paint can with holes around the perimeter of the paint can rim so that paint in the rim can return to the paint can. The device includes a T-shaped base with a can opener at the lower end of the T, two perforating spikes on the bottom, four bumpers for closing the paint can, and a magnet for holding the device to a paint can.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
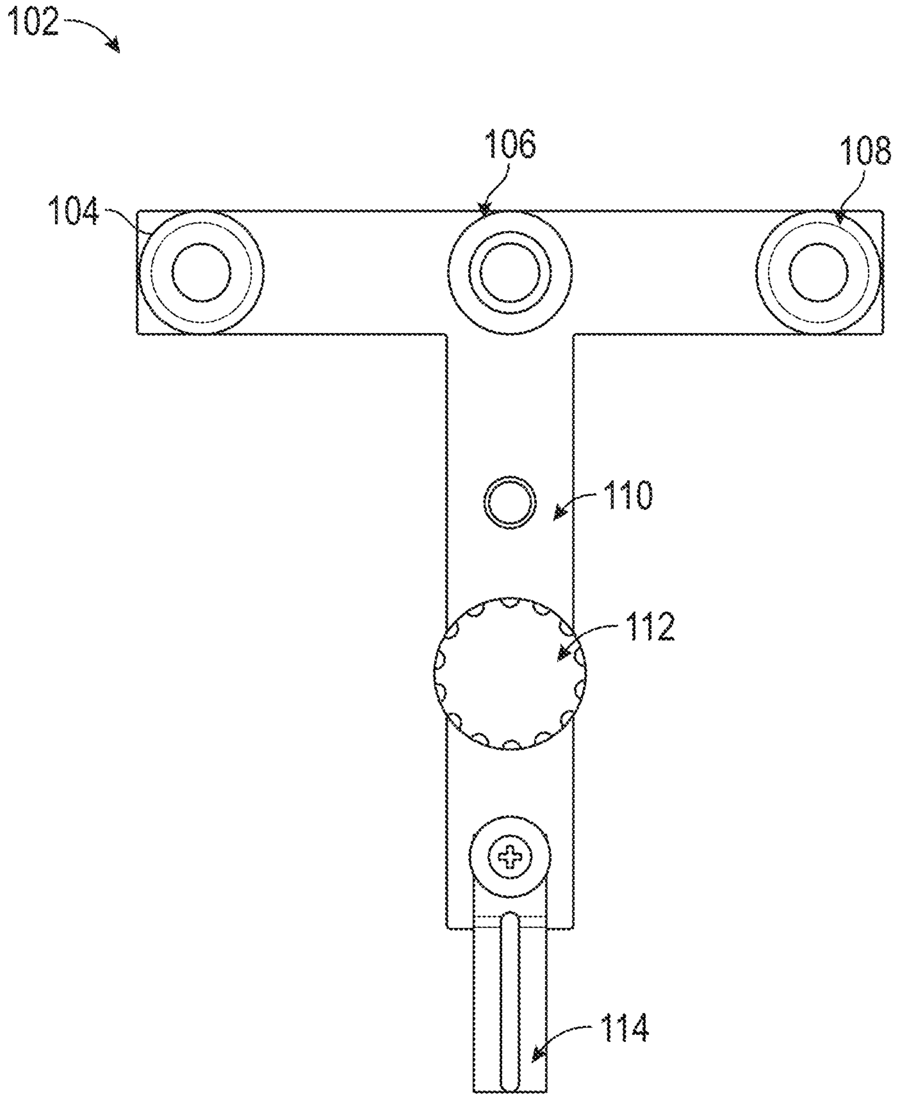
FIG. 1 illustrates the top side of the hammerhead tool.

All illustrations of the drawings are for the purpose of describing selected versions of the present invention and are not intended to limit the scope of the present invention.

The present inventions replace a traditional hammer or rubber mallet, and typical paint can opener with a multi-tool device, the Hammerhead tool 102, that opens and closes a paint can 402 without damage to the paint can lid 404 or paint can 402. The present inventions also perforate the Paint Can 402 with holes around the perimeter of the paint can rim 406 for additional benefit.

This Hammerhead tool 102 opens a paint can 402 and perforated holes around the perimeter of the paint can rim 406 with the use of a hammer to allow dripping paint (hereafter "drippage") back into the paint can 402. An offset created by a plurality of perforating cone spike 202, 206 provides precision alignment when closing thereby preventing any warping of the paint can lid 404. This product can be used for both painting and coating applications. It will provide a cleaner workplace, less waste of material, and a unique customizable self-build quality that professionals in the trade will enjoy.

The Hammerhead tool 102 is a paint can 402 accessory used to open a paint can 402, close a paint can 402, attach to the paint can 402, and perforate holes around the perimeter of the paint can rim 406. In one embodiment, the main components are a steel t-bracket mending plate 110, rubber chair bumpers 104,106,108,204, cone spikes 202,206, and an electrical clamp 114. You start by opening the 402 with its can opener 114, and then use a hammer to insert perforating holes around the paint can rim 406. Next, the used may use the perforating cone spikes 202,206 to line up the closing bumper 106 for dosing, and then hammer the paint can 402 shut. After paint can 402 is shut, attach Hammerhead tool 102 to the outside of the paint can 402 with magnet 208.

In one embodiment the Hammerhead tool 102 is made with a metal T-mending bracket 110, rubber chair bumpers 104,106,108,204, basic cabinet pull handle 112, metal cone spikes (generally used for decorative purposes in fashion design for example, dog collar spike) 202,204, a metal ½-¾ electrical clamp 114, and a magnet 208 on the inside to attach to paint can 402 or handle.

The metal T-mending bracket 110 may be a base for the other features and provide the precise offset for both perforating and closing the paint can 402. The cone spikes 202,206 are essential to provide the holes needed to allow the paint product to drain back into the paint can 402. The rubber bumpers 104,106,108,204 are needed to engage impact. The cabinet pull handle 112 is needed for comfort and to line up the Hammerhead tool 102, keeping the hand safe from impact. The electric clamp 114 opens the paint can 402 and provides a comfortable place for fingers when applying leverage with handle 112 when opening.

The advantages of the Hammerhead tool 102 include the following: less mess, less waste, no air intrusion, no warping of paint can lid 404, sturdy steel construction, customizable for each owner (no confusion as to tool ownership). The device is great for coating with A and B paints where viscosities differ, and measurements need to be precise. It also extends the life of the paint with the precision closing of the paint can 402.

The Hammerhead tool 102 utilizes parts that would not normally be used for this application and can only be used in conjunction to fit this multi-tool's purpose.

In one embodiment, the cone spikes 202,206 are made with screw-back studs and bullet rivets. The rubber bumpers 104,106,108,204 and magnet 208 are held together with Chicago binding screws commonly used in craft applications. In one embodiment, the stainless-steel T-bracket 110 has a size is 102 mm×102 mm and has 5 holes.

A small screwdriver for switch plates commonly taken off when painting could be incorporated into the Hammerhead tool 102. In one embodiment, rubber caps may be included for safety on the perforating cone spikes 202,206. The Hammerhead tool's 102 magnet 208 may keep the product out of harm's way with little to no chance of injury.

In one embodiment, the T-mending plate 110 is made of steel with a Rockwell hardness of 32-56".

In one embodiment, the Hammerhead tool 102 is mainly steel construction, over time the cone spikes 202,206 may break off and be replaced. Replacement parts are projected to be made available along with customization purposes. Given the product works with paint and epoxy components might need to be replaced due to spillage or overuse. That said, the tool and its parts are not tool-specific and can be replaced easily.

The Hammerhead tool 102 could be manufactured with molding, injection molding, overmolding, two-shot molding, co-injection molding, 3-D printing, welding, or other processes. In one embodiment, the rubber bumpers 104,106, 108,204 could be injection molded into position and then a stronger plastic could be overmolded over the rubber. In another embodiment, the T-mending plate 110, the handle 112, the can opener 114, and the Perforating cone spike 202,206 could be created in a single piece through molding, additive processing (3-D printing), or subtractive processing (milling with a milling machine or a lathe), or any combination thereof. Studs for bumpers 104, 106, 108, 204 could be also included in the single piece. Then the single piece could be placed in an injection mold machine, and the material for the bumpers 104, 106, 108, 204 could be injected. A magnet 208 could then be added.

Turning to FIG. 1, the top side of the Hammerhead tool 102 is seen. The Hammerhead tool 102 may have a T-shaped mending T-mending plate 110 as the base. The T-mending plate 110 could be a first elongated structure section comprising a top side, a bottom side, a can opener end and a bumper end separated from the can opener end by a first length. This first length is the vertical section in the middle of the T. The T-mending plate 110 could have a second elongated structure section comprising a top side, a bottom side, a first end, and a second end separated from the first end by a second length (to top of the T) wherein the second elongated structure section is perpendicular to the first elongated structure section, wherein the second elongated structure section is bisected by the first elongated structure section at a point on the second elongated structure section that is proximal to the first elongated structure section bumper end, and wherein the second elongated structure section is mechanical union with the first elongated structure section. This T-mending plate 110 may be 102 mm along the top and 18 mm wide, and 102 mm down the middle of the T, 18 mm wide. In one embodiment, the T-mending plate 110 is made of hardened steel, it could also be made of stainless steel, steel, aluminum, titanium, white metal, iron, zinc, copper, tin, lead, magnesium, gold, silver, platinum, nickel, chromium, bronze, or any alloy or combination using these metals. Various types of plastics or wood could also be used.

Attached to the T-mending plate 110 could be three bumpers 104, 106, 108,204 along the top of the T. These bumpers could be made of rubber, plastic (polyethylene, polypropylene, polystyrene, polyethylene terephthalate (PET), etc.), silicon, cardboard, paper, bagasse, bamboo fiber, other plant fibers, stainless steel, aluminum, titanium, white metal, iron, zinc, copper, tin, lead, magnesium, gold, silver, platinum, nickel, chromium, bronze, etc. Bumpers 104,106,108, 204 maybe be attached to the T-mending plate 110 with adhesives, screws, rivets, nuts and bolts, welding, molding, injection molding, overmolding, two-shot molding, co-injection molding, 3-D printing, or other processes. In one embodiment, the rubber bumpers 104,106, 108,204 could be injection molded into position and then a stronger plastic could be overmolded over the rubber. In some embodiments, the pair of perforating bumpers 104, 108 could be smaller than the closing bumper 106. The closing bumper 106 could be disposed in the second elongated structure section (top of the T) top side proximal to the first elongated structure section bumper end at the point where the first elongated structure section bisects the second elongated structure section (i.e. At the intersection of the two lines in the T). The pair of perforating bumpers 104, 108 could be disposed in the second elongated structure section (top of the T) top side at the first and second ends of the top of the T.

A Handle 112 is also attached to the top side of the Hammerhead tool 102, on the long portion of the T. The handle 112 could be disposed on the first elongated structure section top side at a point proximal to the can opener end. The handle 112 could have a knurled grip. The handle 112 could be attached to the T-mending plate 110 with a screw, rivets, nuts and bolts, adhesives, welding, molding, injection molding, overmolding, two-shot molding, co-injection molding, 3-D printing, or other processes. The Handle 112 could be one-third of the distance from the bottom of the T. The Handle 112 could be made of stainless steel, steel, aluminum, titanium, white metal, iron, zinc, copper, tin, lead, magnesium, gold, silver, platinum, nickel, chromium, bronze, or any alloy or combination using these metals. Various types of plastics (polyethylene, polypropylene, polystyrene, polyethylene terephthalate (PET), etc.), silicon, or wood could also be used.

The bottom of the T portion of the Hammerhead tool 102 is the can opener 114. This could be a separate piece attached to the T-mending plate 110 with a screw, a rivet, nut and bolt, welding, or the can opener 114 could be integral to the T-mending plate 110, either through molding, stamping, 3-D printing, milling or other similar methodologies. The Can opener 114 could be made of stainless steel, steel, aluminum, titanium, white metal, iron, zinc, copper, tin, lead, magnesium, gold, silver, platinum, nickel, chromium, bronze, or any alloy or combination using these metals. Various types of plastics (polyethylene, polypropylene, polystyrene, polyethylene terephthalate (PET), etc.), silicon, or wood could also be used.

Figure 2:
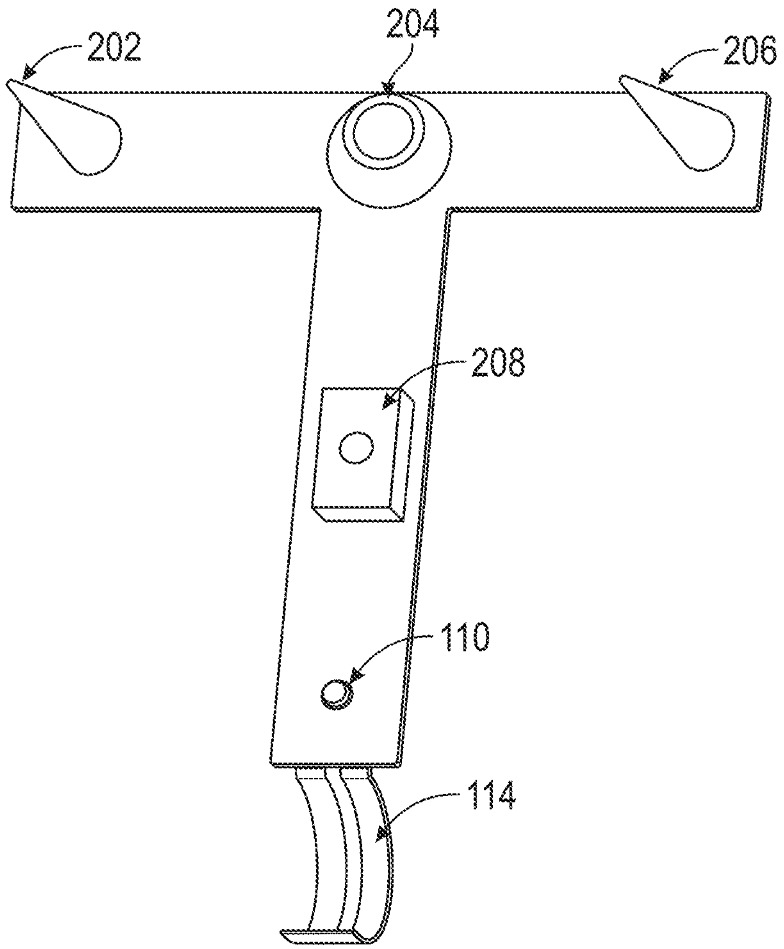
FIG. 2 illustrates the bottom side of the hammerhead tool.

FIG. 2 shows the bottom side of the Hammerhead tool 102. The bottom side of the T-mending plate 110 is seen with the Can opener 114 at the bottom of the T.

About two-thirds of the distance from the bottom of the T could have a magnet 208 affixed to the T-mending plate 110. The Magnet 208 could be disposed on the first elongated structure section bottom side (the vertical line of the T), wherein the magnet is in mechanical union with the first elongated structure section, and wherein the magnet is disposed approximately at a mid-point of the first length. The magnet 208 could be affixed with magnetic force alone, with adhesives, a screw, rivets, nuts and bolts, welding, molding, injection molding over the inserted magnet 208, 3-D printing, or other processes.

The bottom side of the Hammerhead tool 102 may also include a bottom bumper 204 on the top of the T as described above.

Two perforating cone spikes 202,206 may be on the opposite ends of the top of the T, facing toward the bottom. The pair of perforating cone spikes 202, 206 could be disposed in the second elongated structure section bottom side at respective first and second ends (the two ends of the top of the T), wherein the pair of the perforating cone spikes are separated by a distance that will fit within an arc of a rimmed paint can opening. The perforating cone spikes 202, 206 could be made of stainless steel, steel, aluminum, titanium, white metal, iron, zinc, copper, tin, lead, magnesium, gold, silver, platinum, nickel, chromium, bronze, or any alloy or combination using these metals. Various types of plastics (polyethylene, polypropylene, polystyrene, polyethylene terephthalate (PET), etc.), silicon, or wood could also be used. The perforating cone spikes 202,206 could be attached to the T-mending plate 110 with a screw, rivets, nuts and bolts, adhesives, welding, molding, injection molding, overmolding, two-shot molding, co-injection molding, 3-D printing, or other processes.

Figure 3:
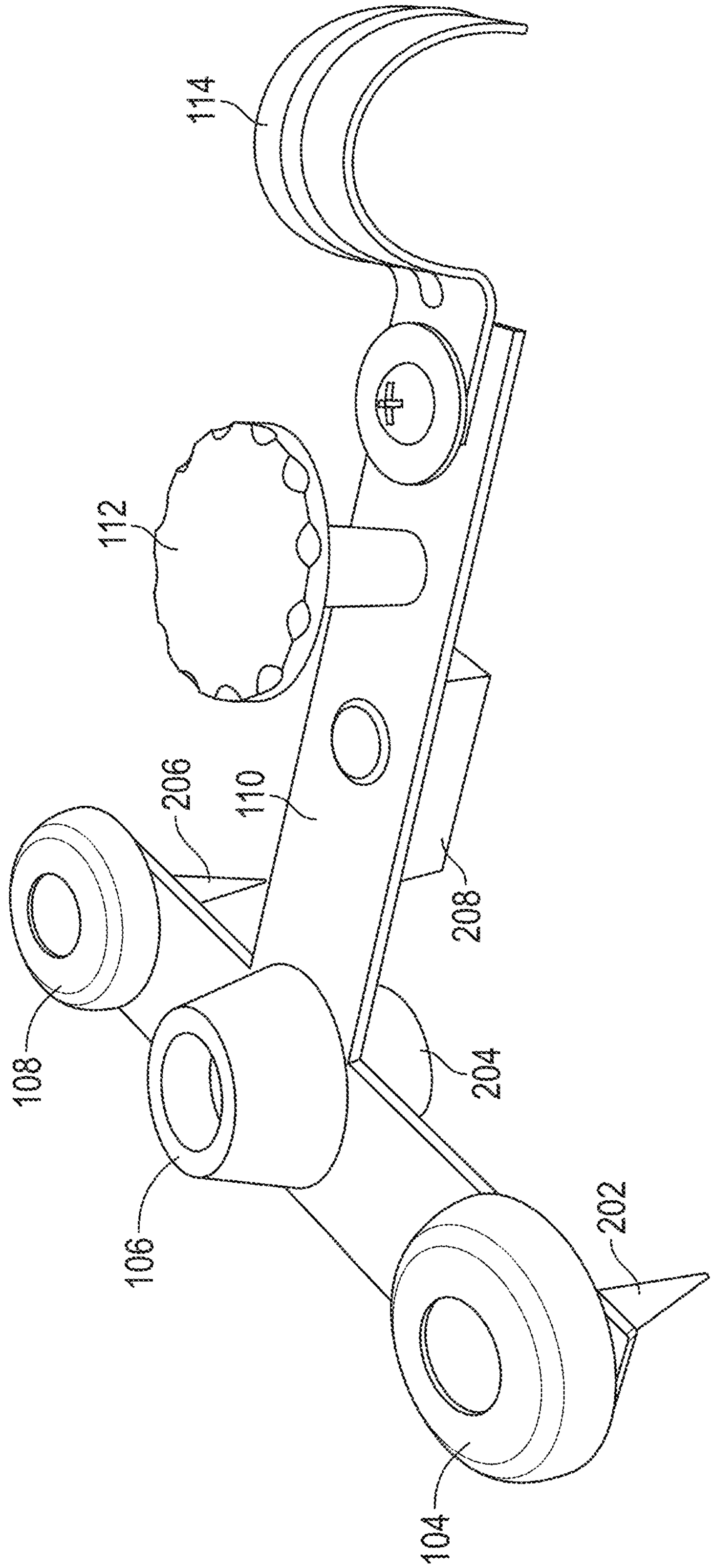
FIG. 3 illustrates a perspective view of the hammerhead tool.

FIG. 3 is a perspective view of the Hammerhead tool 102, where each of the elements can be seen. The T-mending plate 110 is in the center, with the handle 112 and the rubber bumpers 104,106,108, 204 attached to the top of the T. The perforating cone spikes 202, 206 and the magnet 208 are attached to the bottom. The can opener 114 is attached to the end of the T.

Figure 4:
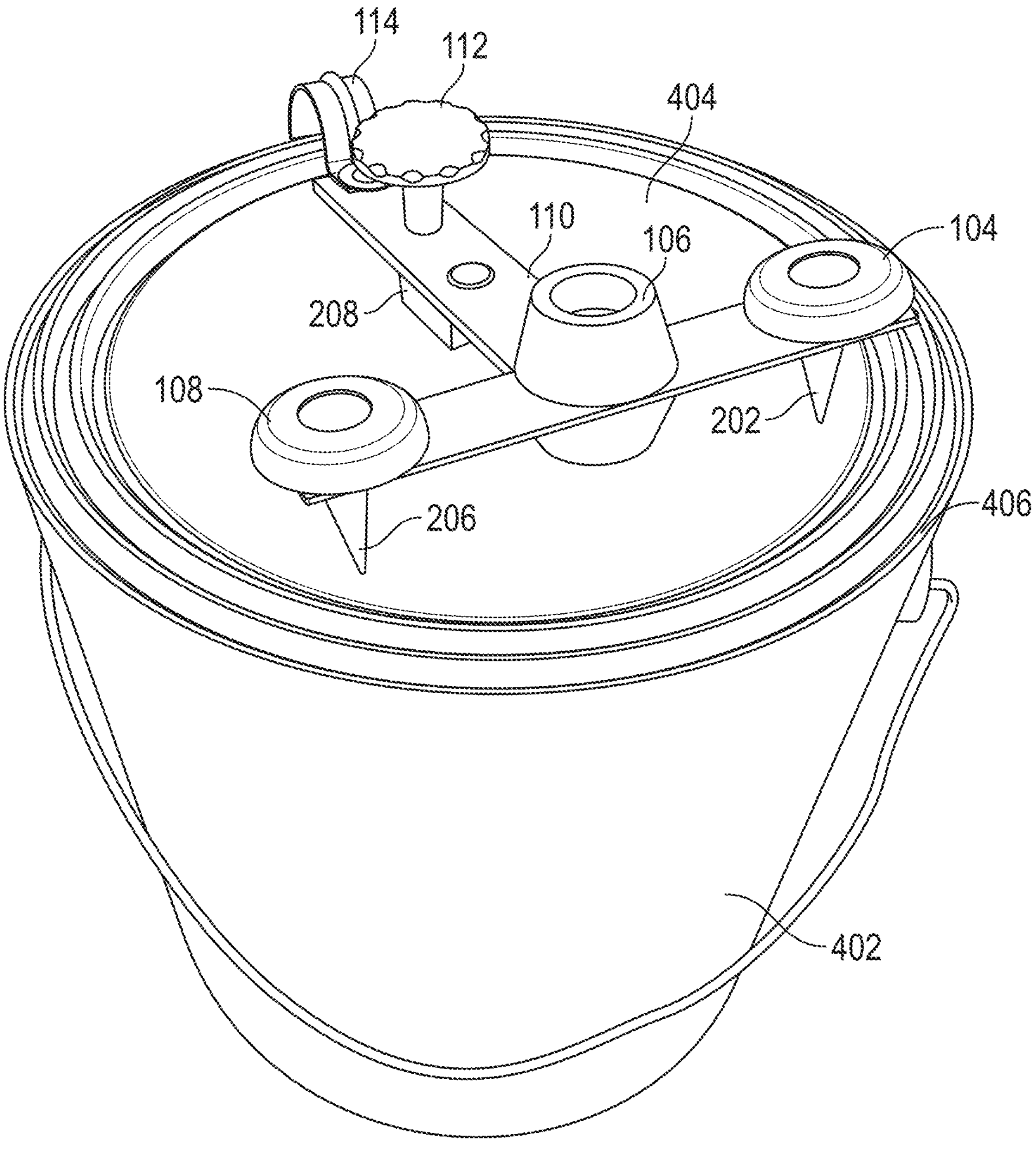
FIG. 4 illustrates the hammerhead tool as being used to open a paint can.

The Hammerhead tool 102 in use on a Paint Can 402 is shown in FIG. 4. This drawing shows the paint can 402 with its paint can rim 406 and paint can lid 404. In FIG. 4, the can opener 114 is on the paint can rim 406, ready to pry the paint can lid 404 up from the paint can rim 406. A user would be lifting the handle 112 to apply force through the can opener 114 to pry the paint can lid 404.

In summary, the present invention is a device for opening and closing a paint can without damage to the paint can lid or paint can. The device can also perforate the paint can with holes around the perimeter of the paint can rim so that paint in the rim can return to the paint can. The device includes a T-shaped base with a can opener at the lower end of the T, two perforating spikes on the bottom, four bumpers for closing the paint can, and a magnet for holding the device to a paint can.

In some aspects, the techniques described herein relate to a device including: a first elongated structure section including a top side, a bottom side, a can opener end and a bumper end separated from the can opener end by a first length; a second elongated structure section including a top side, a bottom side, a first end and a second end separated from the first end by a second length; and wherein the second elongated structure section is disposed perpendicular to the first elongated structure section, wherein the second elongated structure section is bisected by the first elongated structure section at a point on the second elongated structure section that is proximal to the first elongated structure section bumper end, and wherein the second elongated structure section is mechanical union with the first elongated structure section; a can opener disposed on the first elongated structure section can opener end top side; a closing bumper disposed in the second elongated structure section top side proximal to the first elongated structure section bumper end at the point where the first elongated structure section bisects the second elongated structure section; a pair of perforating bumpers respectively disposed in the second elongated structure section top side at respective first and second ends; a pair of perforating cone spikes respectively disposed in the second elongated structure section bottom side at respective first and second ends, wherein the pair of the perforating cone spikes are separated by a distance that will fit within an arc of a rimmed paint can opening; a magnet disposed on the first elongated structure section bottom side, wherein the magnet is in mechanical union with the first elongated structure section, and wherein the magnet is disposed approximately at a mid-point of the first length; and a handle disposed on the first elongated structure section top side at a point proximal to the can opener end.

In some aspects, the techniques described herein relate to a device further including a screwdriver attached to the first elongated structure section.

In some aspects, the techniques described herein relate to a device wherein the handle includes a knurled grip.

In some aspects, the techniques described herein relate to a device wherein the first elongated structure section is steel.

In some aspects, the techniques described herein relate to a device wherein the steel is hardened steel.

In some aspects, the techniques described herein relate to a device wherein the pair of the perforating cone spikes are steel.

In some aspects, the techniques described herein relate to a device wherein the can opener is the same material as the first elongated structure section.

In some aspects, the techniques described herein relate to a device wherein the first elongated structure section, the second elongated structure section, and the can opener are a single integral structure.

In some aspects, the techniques described herein relate to a device wherein the single integral structure further includes the handle.

In some aspects, the techniques described herein relate to a device wherein the single integral structure further includes the pair of perforating cone spikes.

In some aspects, the techniques described herein relate to a device wherein the closing bumper is attached to the first elongated structure section with a nut and a bolt.

In some aspects, the techniques described herein relate to a device wherein at least one of the pair of perforating bumpers is attached to the first elongated structure section with a screw.

In some aspects, the techniques described herein relate to a device wherein the screw extends through at least one of the pair of perforating bumpers, through the first elongated structure section, and into one of the pair of perforating cone spikes.

In some aspects, the techniques described herein relate to a device wherein the closing bumper is riveted to the first elongated structure section.

In some aspects, the techniques described herein relate to a method of manufacture including: a first elongated structure section including a top side, a bottom side, a can opener end and a bumper end separated from the can opener end by a first length; a second elongated structure section including a top side, a bottom side, a first end and a second end separated from the first end by a second length; and wherein the second elongated structure section is disposed perpendicular to the first elongated structure section, wherein the second elongated structure section is bisected by the first elongated structure section at a point on the second elongated structure section that is proximal to the first elongated structure section bumper end, and wherein the second elongated structure section is mechanical union with the first elongated structure section; a can opener disposed on the first elongated structure section can opener end top side; a pair of perforating cone spikes respectively disposed in the second elongated structure section bottom side at respective first and second ends, wherein the pair of the perforating cone spikes are separated by a distance that will fit within an arc of a rimmed paint can opening; where the first elongated structure section, the second elongated structure section, the pair of the perforating cone spikes, and the can opener are manufactured as a single piece of material.

In some aspects, the techniques described herein relate to a method further including a handle disposed on the first elongated structure section top side at a point proximal to the can opener end, where the first elongated structure section, the second elongated structure section, the pair of the perforating cone spikes, the handle and the can opener are manufactured as a single piece of material.

In some aspects, the techniques described herein relate to a method where the first elongated structure section, the second elongated structure section, the pair of perforating cone spikes, the handle, and the can opener are manufactured as a single piece of material through a 3-D printing process.

In some aspects, the techniques described herein relate to a method where the first elongated structure section, the second elongated structure section, the pair of perforating cone spikes, the handle, and the can opener are manufactured as a single piece of material through an injection molding process.

In some aspects, the techniques described herein relate to a method further including a closing bumper disposed in the second elongated structure section top side proximal to the first elongated structure section bumper end at the point where the first elongated structure section bisects the second elongated structure section; and a pair of perforating bumpers respectively disposed in the second elongated structure section top side at respective first and second ends; where the first elongated structure section, the second elongated structure section, the pair of the perforating cone spikes, the handle, and the can opener are manufactured as a single piece of material through an overmolding injection molding process that molds the closing bumper and the pair of the perforating bumpers.

In some aspects, the techniques described herein relate to a method further including a magnet disposed on the first elongated structure section bottom side, wherein the magnet is in mechanical union with the first elongated structure section, and wherein the magnet is disposed approximately at a mid-point of the first length, wherein the magnet is inserted in the mold before the injection molding begins.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies.

The foregoing devices and operations, including their implementation, will be familiar to, and understood by, those having ordinary skill in the art. This specification contains numerous dimensions, all of which could be changed without deviating from the inventions herein.

The above description of embodiments, alternative embodiments, and specific examples are given by way of illustration and should not be viewed as limiting. Further, many changes and modifications within the scope of the present embodiments may be made without departing from the spirit thereof, and the present inventions include such changes and modifications.

What is claimed is:

1. A device comprising:

a first elongated structure section comprising a top side, a bottom side, a can opener end and a bumper end separated from the can opener end by a first length;

a second elongated structure section comprising a top side, a bottom side, a first end, and a second end separated from the first end by a second length;

wherein the second elongated structure section is disposed perpendicular to the first elongated structure section and connected to the bumper end of the first elongated structure at a center of the length of the second elongated structure, and wherein the second elongated structure section is mechanically fixed to the first elongated structure section;

a can opener disposed on the first elongated structure section can opener end top side;

a closing bumper disposed on the second elongated structure section top side proximal to the point where the first elongated structure section meets the second elongated structure section;

a pair of perforating cone spikes respectively disposed on the second elongated structure section bottom side at respective first and second ends, wherein the pair of the perforating cone spikes are separated by a distance that will fit within an arc of a rimmed paint can opening;

a pair of perforating bumpers respectively disposed on the second elongated structure section top side at respective first and second ends corresponding to the perforating cone spikes;

a magnet disposed on the first elongated structure section bottom side, wherein the magnet is mechanically fixed with the first elongated structure section, and wherein the magnet is disposed approximately at a mid-point of the first length; and a handle disposed on the first elongated structure section top side at a point between the can opener end and the bumper end.

2. The device of claim 1 wherein the handle comprises a knurled grip.

3. The device of claim 1 wherein the first elongated structure section is steel.

4. The device of claim 3 wherein the steel is hardened.

5. The device of claim 1 wherein the pair of the perforating cone spikes are steel.

6. The device of claim 1 wherein the can opener is a same material as the first elongated structure section.

7. The device of claim 1 wherein the first elongated structure section, the second elongated structure section, and the can opener are a single integral and unitary structure.

8. The device of claim 7 wherein the single integral and unitary structure further includes the handle.

9. The device of claim 7 wherein the single integral and unitary structure further includes the pair of the perforating cone spikes.

10. The device of claim 1 wherein the closing bumper is attached to the first elongated structure section with a nut and a bolt.

11. The device of claim 1 wherein at least one of the pair of the perforating bumpers is attached to the first elongated structure section with a screw.

12. The device of claim 11 wherein the screw extends through the at least one of the pair of the perforating bumpers, through the first elongated structure section, and into one of the pair of the perforating cone spikes.

13. The device of claim 1 wherein the closing bumper is riveted to the first elongated structure section.

14. A method of manufacture comprising the steps of:

providing:

a first elongated structure section comprising a top side, a bottom side, a can opener end and a bumper end separated from the can opener end by a first length;

a second elongated structure section comprising a top side, a bottom side, a first end, and a second end separated from the first end by a second length;

wherein the second elongated structure section is disposed perpendicular to the first elongated structure section and connected to the bumper end of the first elongated structure at a center of the length of the second elongated structure, and wherein the second elongated structure section is mechanically fixed to the first elongated structure section;

a can opener disposed on the first elongated structure section can opener end top side;

a closing bumper disposed on the second elongated structure section top side proximal to the point where the first elongated structure section meets the second elongated structure section;

a pair of perforating cone spikes respectively disposed on the second elongated structure section bottom side at respective first and second ends, wherein the pair of the perforating cone spikes are separated by a distance that will fit within an arc of a rimmed paint can opening;

a pair of perforating bumpers respectively disposed on the second elongated structure section top side at respective first and second ends corresponding to the perforating cone spikes; and forming the first elongated structure section, the second elongated structure section, the pair of the perforating cone spikes, and the can opener as a single piece of material.

15. The method of claim 14 further comprising providing a handle disposed on the first elongated structure section top side at a point between the can opener end and the bumper end, wherein the step of forming the first elongated structure section, the second elongated structure section, the pair of the perforating cone spikes, and the can opener as the single piece of the material includes also forming the handle as part of the single piece of material.

16. The method of claim 15 wherein the step of forming the first elongated structure section, the second elongated structure section, the pair of the perforating cone spikes, the handle, and the can opener are manufactured as the single piece of the material is performed through a 3-D printing process.

17. The method of claim 15 wherein the step of forming the first elongated structure section, the second elongated structure section, the pair of the perforating cone spikes, the handle, and the can opener are manufactured as the single piece of the is performed through an injection molding process.

18. The method of claim 17, wherein the step of forming the first elongated structure section, the second elongated structure section, the pair of the perforating cone spikes, the handle, and the can opener as a single piece of material is performed through an overmolding injection molding process that molds the closing bumper and the pair of the perforating bumpers in a mold.

19. The method of claim 18 further comprising providing a magnet disposed on the first elongated structure section bottom side, wherein the magnet is fixed to the first elongated structure section, and wherein the magnet is disposed approximately at a mid-point of the first length, wherein the step of providing the magnet is performed by inserting the magnet in the mold before the injection molding begins.

* * * * *